(12) United States Patent
Soto Infante

(10) Patent No.: US 11,230,163 B2
(45) Date of Patent: Jan. 25, 2022

(54) VEHICLE AIR HANDLING SYSTEM

(71) Applicant: Nissan North America, Inc., Franklin, TN (US)

(72) Inventor: Amilkar Soto Infante, Estado de México (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 517 days.

(21) Appl. No.: 16/051,195

(22) Filed: Jul. 31, 2018

(65) Prior Publication Data
US 2020/0039322 A1 Feb. 6, 2020

(51) Int. Cl.
*B60H 1/00* (2006.01)

(52) U.S. Cl.
CPC ..... *B60H 1/00842* (2013.01); *B60H 1/00871* (2013.01)

(58) Field of Classification Search
CPC ............ B60H 1/00842; B60H 1/00871; B60H 1/00864; B60H 1/00642; B60H 1/00007; B60H 1/34; B60H 1/247
USPC ........................................... 454/75, 152–161
See application file for complete search history.

(56) References Cited

U.S. PATENT DOCUMENTS

| | | | | |
|---|---|---|---|---|
| 5,738,580 A | * | 4/1998 | Baek ..................... | F24F 13/075 454/153 |
| 6,019,288 A | * | 2/2000 | Arold ................. | B60H 1/00064 165/204 |
| 6,599,182 B1 | * | 7/2003 | Schwarz ............ | B60H 1/00842 454/152 |
| 7,377,848 B2 | | 5/2008 | Voit, II et al. | |
| 9,266,406 B2 | * | 2/2016 | Morikawa .......... | B60H 1/00864 |
| 2012/0142264 A1 | * | 6/2012 | Sagou ................ | B60H 1/00842 454/75 |
| 2015/0328958 A1 | | 11/2015 | Winget, Jr. et al. | |

FOREIGN PATENT DOCUMENTS

| | | | |
|---|---|---|---|
| EP | 2752624 A1 | 7/2014 | |
| JP | 59114119 A | * 7/1984 | ......... B60H 1/00871 |

OTHER PUBLICATIONS

JP-59114119-A English translation of Abstract.*

* cited by examiner

*Primary Examiner* — Helena Kosanovic
(74) *Attorney, Agent, or Firm* — Global IP Counselors, LLP

(57) ABSTRACT

A vehicle air handling system includes a user input interface, air duct housing, first and second panel duct doors, at least one air blower, and a first panel actuation assembly. The air duct housing has an air inlet, and first and second panel ducts. The first and second panel duct doors are disposed to selectively open and close the first and second panel ducts, respectively. Air is drawn into the air duct housing via the air inlet and conveyed toward the panel ducts. The first panel actuation assembly is operatively coupled to the first and second panel duct doors to simultaneously control positions in response to operation of the user input interface between a plurality of settings. The positions of the first and second panel duct doors include at least one setting in which different airflow volumes are passed by the first and second panel duct doors.

17 Claims, 15 Drawing Sheets

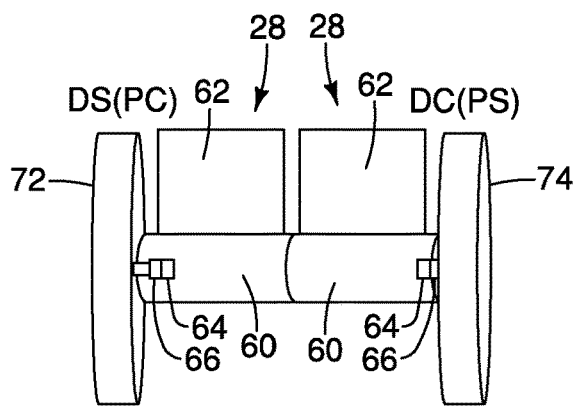
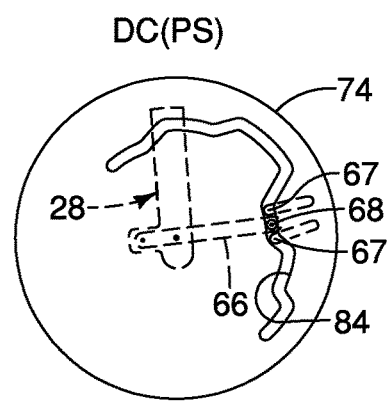
FIG. 20
FIG. 21
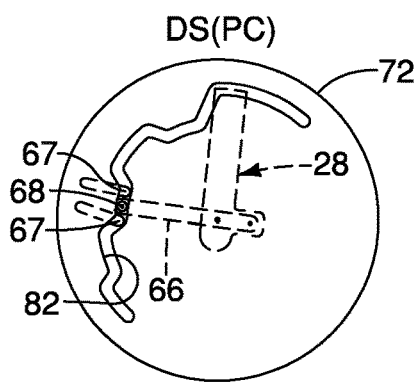
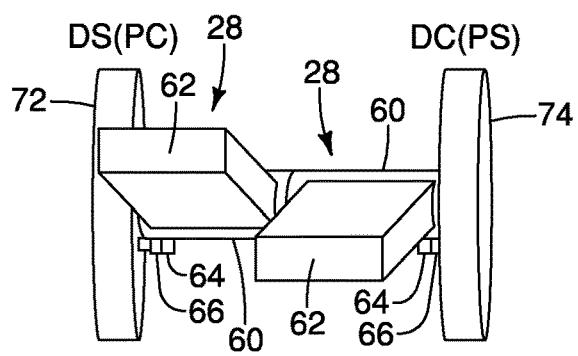
FIG. 22
FIG. 23
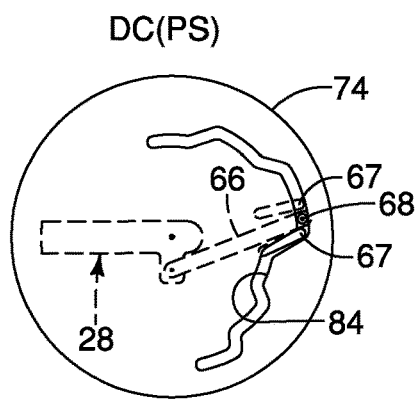
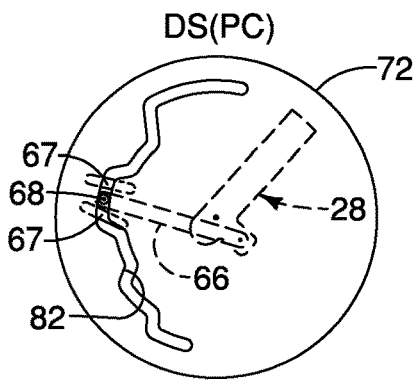
FIG. 24
FIG. 25

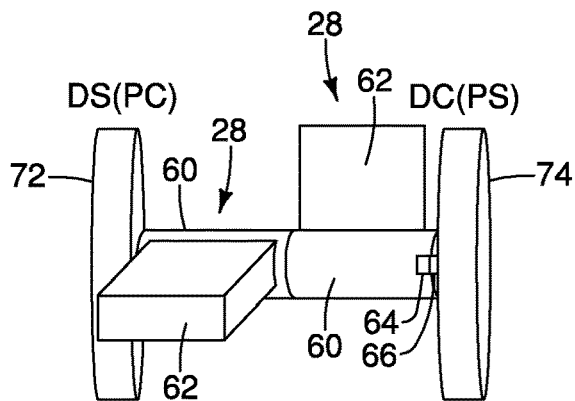
FIG. 32
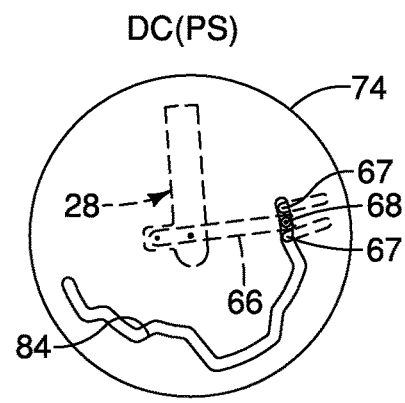
FIG. 33
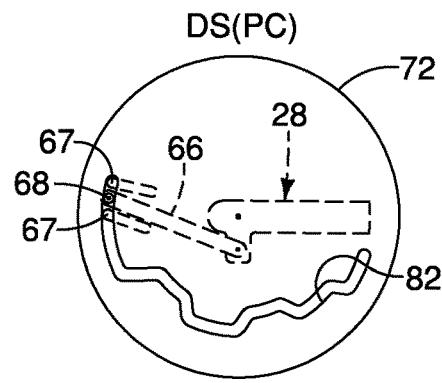
FIG. 34
| # | DRIVER | | # | PASSENGER | |
|---|---------|---------|---|-----------|---------|
| 1 | Close | Close | 1 | Close | Close |
| 2 | Partial | Partial | 2 | Partial | Partial |
| 3 | Open | Open | 3 | Open | Open |
| 4 | Partial | Close | 4 | Partial | Close |
| 5 | Open | Close | 5 | Open | Close |
| 6 | Close | Partial | 6 | Close | Partial |
| 7 | Close | Open | 7 | Close | Open |
FIG. 35

VEHICLE AIR HANDLING SYSTEM

BACKGROUND

Field of the Invention

The present invention generally relates to a vehicle air handling system. More specifically, the present invention relates to a vehicle air handling system including panel duct doors permitting different air flow volumes to flow through panel ducts.

Background Information

Most vehicles include a climate control system. Typical climate control systems include a heating, ventilation and air conditioning unit that includes at least one air blower for moving air through an air circulation network. Typical climate control systems allow passengers of the vehicle to select between a heating state and a cooling state for the vehicle interior. In addition, air flow between floor ducts, panel ducts and defrost ducts can be selected. Two or three mode doors can be used to switch the air flow between floor, panel, defrost, and bilevel modes. When air is flowing through the panel ducts air flows equally through the panel ducts. FIG. 40 illustrates a Prior Art panel ducts arrangement with a single mode door that controls air flow to all the panel ducts. In addition to the mode doors mentioned above, vehicles typically have manual grill shutters on the panel vent outlets. Passengers sometimes close or partially close their vent shutter(s).

SUMMARY

Typically, a driver will want to close or adjust the passenger vent shutter(s) to adjust airflow in order to improve driver comfort of the driver or other passengers, improve side window defrosting, or improve noise reduction. When there is no passenger, the driver may want to close or adjust the passenger vent shutter(s) to adjust airflow in order to improve driver comfort. In addition, the driver may want to adjust multiple grill shutters and some may be out of reach. Moreover, even when there is a passenger, the driver and/or passenger may want to adjust multiple grill shutters.

Therefore, it is an object of the present invention to provide an improved vehicle air handling system with improved control of airflow through the panel ducts.

It is also an object of the present invention to provide an improved vehicle air handling system in which control of airflow through the panel ducts is accomplished with a relatively simple and lightweight structure.

In view of the state of the known technology, one aspect of the present disclosure is to provide a vehicle air handling system including a user input interface, an air duct housing, a first panel duct door, a second panel duct door, at least one air blower, and a first panel actuation assembly. The air duct housing has an air inlet, a first panel duct and a second panel duct. The first panel duct door is disposed to selectively open and close the first panel duct. The second panel duct door is disposed to selectively open and close the second panel duct. The at least one air blower draws air into the air duct housing via the air inlet and conveys the air toward the first and second panel ducts. The first panel actuation assembly is operatively coupled to the first and second panel duct doors to simultaneously control positions of the first and second panel duct doors in response to operation of the user input interface between a plurality of settings. The positions of the first and second panel duct doors include at least one setting in which different airflow volumes are passed by the first and second panel duct doors.

BRIEF DESCRIPTION OF THE DRAWINGS

Referring now to the attached drawings which form a part of this original disclosure:

FIG. 20 is schematic elevational view of driver side (DS) and driver center (DC), or passenger center (PC) and passenger side (PS) duct doors and control links illustrated in FIGS. 7-13, with duct doors in fully open and fully open positions;

FIG. 21 is a right side elevational view of the driver center (DC) or passenger side (PS) control link illustrated in FIG. 20;

FIG. 22 is a left side elevational view of the driver side (DS) or passenger center (PC) control link illustrated in FIG. 20;

FIG. 23 is schematic elevational view of driver side (DS) and driver center (DC), or passenger center (PC) and passenger side (PS) duct doors and control links illustrated in FIGS. 7-13, with duct doors in partially open and closed positions;

FIG. 24 is a right side elevational view of the driver center (DC) or passenger side (PS) control link illustrated in FIG. 23;

FIG. 25 is a left side elevational view of the driver side (DS) or passenger center (PC) control link illustrated in FIG. 23;

FIG. 32 is schematic elevational view of driver side (DS) and driver center (DC), or passenger center (PC) and passenger side (PS) duct doors and control links illustrated in FIGS. 7-13, with duct doors in closed and fully open positions;

FIG. 33 is a right side elevational view of the driver center (DC) or passenger side (PS) control link illustrated in FIG. 32;

FIG. 34 is a left side elevational view of the driver side (DS) or passenger center (PC) control link illustrated in FIG. 32;

FIG. 35 is a chart illustrating the combinations of positions for the driver (e.g., driver side and driver center) and passenger (e.g., passenger center and passenger side) and duct doors);

DETAILED DESCRIPTION OF EMBODIMENT(S)

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
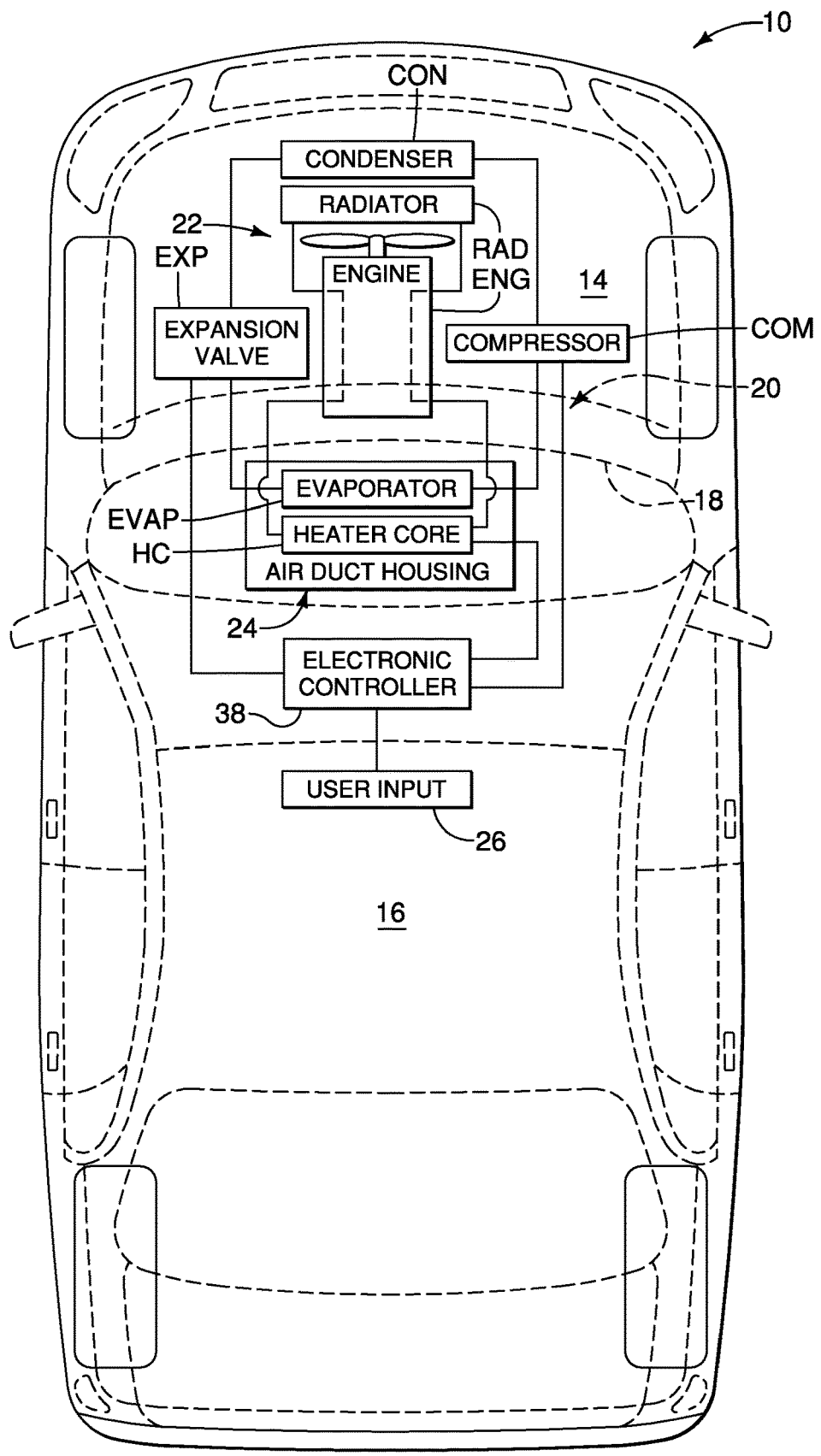
FIG. 1 is a schematic top plan view of a vehicle having a heating and cooling circuit and part of the ductwork of a vehicle air handling system in accordance with a first embodiment.
Figure 3:
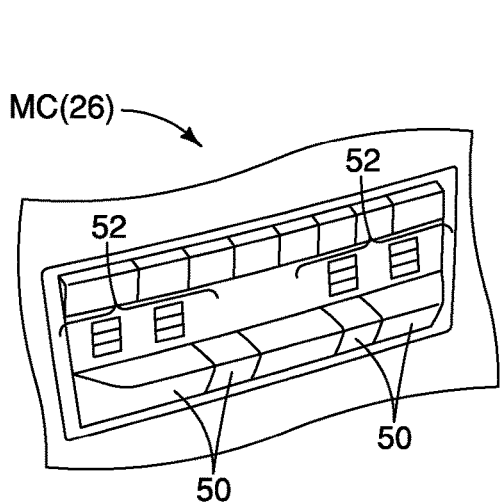
FIG. 3 is an enlarged perspective view of the mechanical climate controls (one example of a user input interface) of the portion of the vehicle passenger compartment illustrated in FIG. 2.
Figure 4:
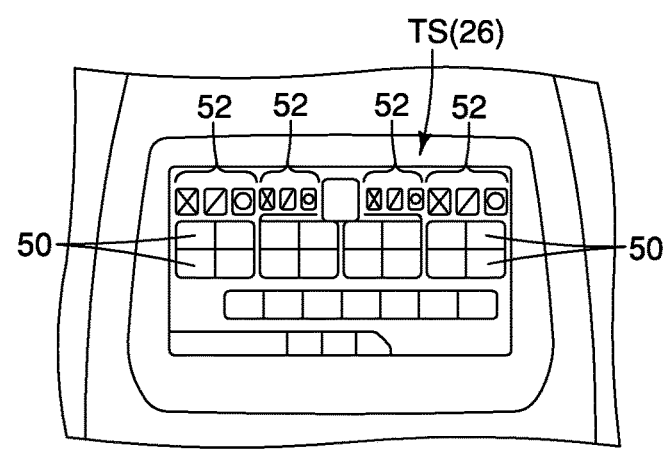
FIG. 4 is an enlarged perspective view of the touch screen climate controls (one example of a user input interface) of the portion of the vehicle passenger compartment illustrated in FIG. 2.
Figure 5:
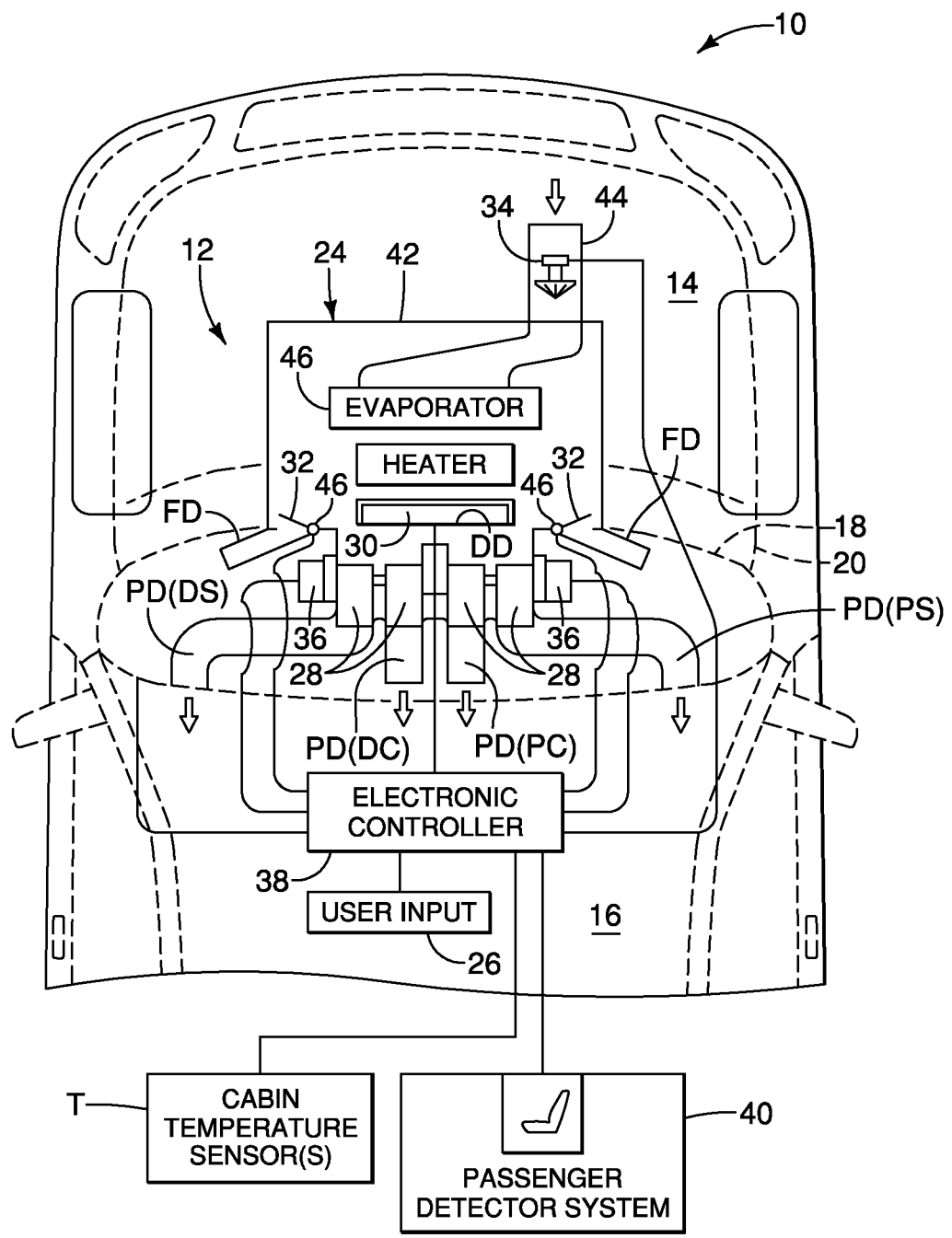
FIG. 5 is a schematic top plan view of the vehicle illustrated in FIGS. 1-4, with the ductwork and other parts of the vehicle air handling system being shown.

Referring initially to FIGS. 1-6, a vehicle 10 is diagrammatically illustrated that includes a vehicle air handling system 12 in accordance with one illustrated embodiment. As shown in FIGS. 1 and 5, the vehicle 10 includes an engine compartment 14 and a passenger compartment 16 separated by a vehicle dash wall 18. The vehicle 10 also includes a cowl box 20 disposed forward of the dash wall 18, and an engine ENG disposed in the engine compartment 14. In the illustrated embodiment, the vehicle air handling system 12 is provided substantially in the passenger compartment 16 of the vehicle 10. In this disclosure, the components of the vehicle air handling system 12 to be described are diagrammatically or schematically illustrated in many illustrations. However, it will be apparent to those skilled in the vehicle field that the exact configurations of the components will vary depending on the particular vehicle.

The vehicle air handling system 12 is part of a climate control system of the vehicle 10. The climate control system further includes a heating and cooling (refrigerant) circuit 22 that together with the vehicle air handling system 12 form parts of a heating, ventilation and air conditioning unit ("HVAC unit") in accordance with an embodiment of the present invention. The heating and cooling circuit 22 basically includes the engine ENG together with a radiator RAD, a heater core HC, a compressor COM, a condenser CON, an expansion valve EXP and an evaporator EVAP, as best seen in FIG. 1. The heating and cooling circuit 22 warms or cools air in an air duct housing 24 in a conventional manner, and thus, will not be explained in further detail herein, except as related to the vehicle air handling system 12 and other parts of the climate control system (HVAC unit).

Figure 6:
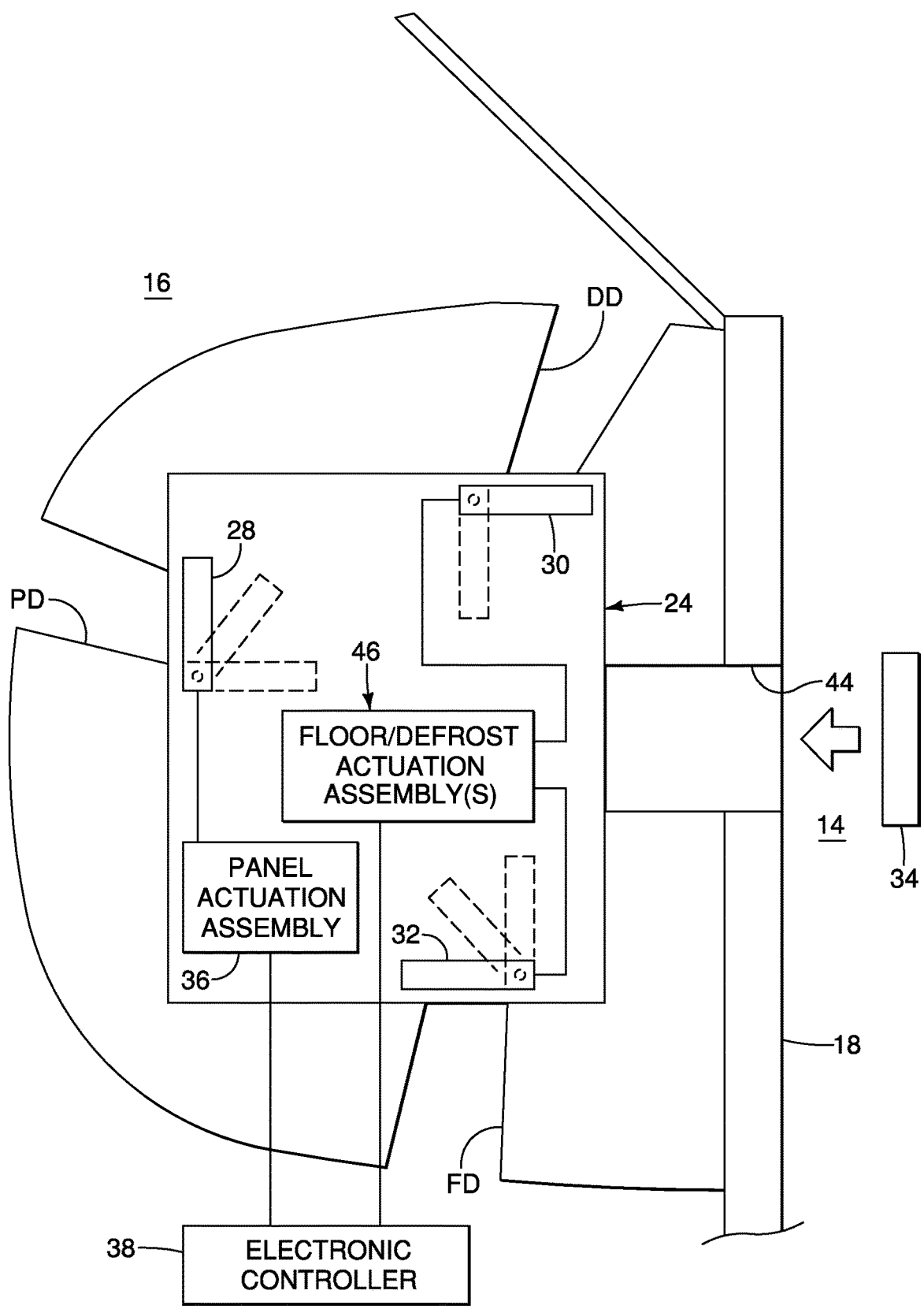
FIG. 6 is a schematic side elevational view of the dashboard, ductwork and other parts of the vehicle air handling system illustrated in FIGS. 1-5, with the floor, panel and defrost ducts and doors diagrammatically illustrated for the purpose of illustration.

Referring now to FIGS. 1-7, the vehicle air handling system 12 in accordance with the present invention includes the air duct housing 24, at least one user input interface 26, a plurality of panel duct doors 28, a defrost duct door 30, a pair of floor duct doors 32, at least one air blower 34, and a pair of actuation assemblies 36. The defrost duct door 30 and the floor duct doors 32 are best seen in FIGS. 5-6. The actuation assemblies 36 can be considered first and second actuation assemblies 36. The vehicle air handling system 12 also preferably includes an electronic controller 38 and a conventional passenger detector system 40. The user input interface 26 and the electronic controller 38 are used to control the other parts of the vehicle air handling system 12.

The user input interface 26, the electronic controller 38 and the passenger detector system 40 will be discussed in more detail below.

The air duct housing 24 includes a main body or HVAC case 42 that houses the heater core HC and the evaporator EVAP, at least one defrost duct DD, a plurality of panel ducts PD, and at least one (a pair illustrated) of floor ducts FD. The main body 42 includes numerous duct openings aligned with the ducts DD, PD and FD. In addition, the main body 42 includes an air inlet 44. As shown, the evaporator EVAP and the heater core HC are disposed downstream of the air inlet 44 with respect to an air intake direction. The air blower 34 draws air into the air duct housing 24 via the air inlet 44 and conveys the air toward the ducts DD, PD and FD. The duct doors 28, 30 and 32 control whether air flows into the ducts DD, PD and FD. In this way, the air passing through the main body 42 of the air duct housing 24 is heated or cooled before the air is conveyed toward the passenger compartment 16. While a single blower 34 is illustrated herein, it will be apparent to those of ordinary skill in the art from this disclosure that multiple blowers 34 could be provided and multiple air inlets 44 could be provided if needed and/or desired.

The ducts DD, PD and FD can be fixedly attached to the main body 42 of the air duct housing 24. Alternatively, the ducts DD, PD and FD can be integrally formed with a part or parts of the main body 42 of the air duct housing 24. However, the main body 42 and the ducts DD, PD and FD are typically made of several individual pieces that are fixed together for conveying air to the passenger compartment 16. More specifically, the main body 42 and the ducts DD, PD and FD can be made of several plastic pieces that are connected together in a conventional manner. As best seen in FIG. 5, the main body or HVAC case 42 has four panel duct openings O leading to four panel ducts PD, and the panel duct doors 28 seal against the panel duct openings O or against walls of the panel ducts PD (against the openings is illustrated).

In view of the above configuration, the air duct housing 24 has a floor duct FD, the at least one air blower 34 conveys the air toward the floor duct FD, and the vehicle air handling system 12 further includes a floor duct door 32 disposed to selectively open and close the floor duct FD, and an auxiliary actuator 46 operatively coupled to floor duct door 32 to control position of the floor duct door 32. In the illustrated embodiment there are a pair of floor ducts FD and floor duct doors 32 controlled by the auxiliary actuator 46. In addition, the air duct housing 24 has a defrost duct DD, the at least one air blower 34 conveys the air toward the defrost duct DD, and the vehicle air handling system 12 further includes a defrost duct door 30 disposed to selectively open and close the defrost duct DD, with the auxiliary actuator 46 being operatively coupled to defrost duct door 30 to control position of the defrost duct door 30. The auxiliary actuator 46 is conventional and thus will not be explained and/or illustrated in detail herein. One example of an auxiliary actuator is one or more motors operatively connected to the defrost duct door 30 and the floor duct doors 32 to move the defrost duct door 30 and the floor duct doors 32 between the positions shown in FIG. 6 in a conventional manner. Since this control is conventional, this control will not be explained and/or illustrated in detail herein, except as related to the present invention.

Referring now to FIGS. 2-5, the dashboard in the passenger compartment 16 preferably includes at least one defrost vent DV, a plurality of panel vents PV, at least one (a pair herein) of floor vents FV on opposite sides of the center console, a touch screen TS and a set of mechanical climate controls MC. The defrost vent DV is connected to the defrost duct DD in a conventional manner. Likewise, the floor vents FV are connected to the floor ducts FD in a conventional manner. However, the panel vents PV are connected to the panel ducts PD in accordance with the present invention. Specifically, the panel vents PV do not have manual, user operable vent shutters usable to close the panel vents PV and control an amount of airflow through each panel vent PV. Rather, the panel duct doors 28 are used to control an airflow volume through the panel ducts PD, and thus out of the panel vents PV. The panel vents PV may still include manual, user operable directional control shutters (not shown). However, preferably, the manual, user operable directional control shutters (not shown) cannot close off, i.e., prevent airflow, from the panel ducts PD from passing through the panel vents PV.

The touch screen TS and the mechanical climate controls MC are examples of the user input interface 26. In either case, the touch screen TS and/or the mechanical climate controls MC are used to control the panel duct doors 28 and the air blower 34 in accordance with the present invention. The touch screen TS and the mechanical climate controls MC are located in the passenger compartment 16, preferably on a dash instrument panel of the vehicle 10. One of the touch screen TS and the mechanical climate controls MC can be eliminated. However, in the illustrated embodiment both the touch screen TS and the mechanical climate controls MC are present. The touch screen TS and the mechanical climate controls MC provide redundant climate controls, which allows the touch screen TS to be used for other purposes such navigation control, audio control, etc., while still allowing the passengers to operate the climate controls using the mechanical climate controls MC. In other words, the touch screen TS is switchable between a climate control screen (mode) and numerous other modes such as audio, navigation, phone, etc. in a conventional manner. In the climate control mode, the touch screen TS provides the same functionality as the mechanical climate controls MC.

As mentioned above, the touch screen TS and the manual climate controls MC are both examples of the user input interface 26 and provide the same functionality. Thus, the following description will be with reference to the user input interface 26, which can be applied to the touch screen TS and the mechanical climate controls MC. The user input interface 26 includes typical climate controls such as an air conditioning ON/OFF switch or button(s), a temperature control switch or button(s) usable to increase or decrease the desired temperature in the passenger cabin, a mode door control switch or button(s), and a fan speed control for the air blower 34, an auto/manual switch or button(s), and a sync switch or button(s). In addition, in the illustrated embodiment, the user input interface 26 also includes one or more panel ventilation mode switch or button(s) 50 in accordance with the present invention.

Figure 2:
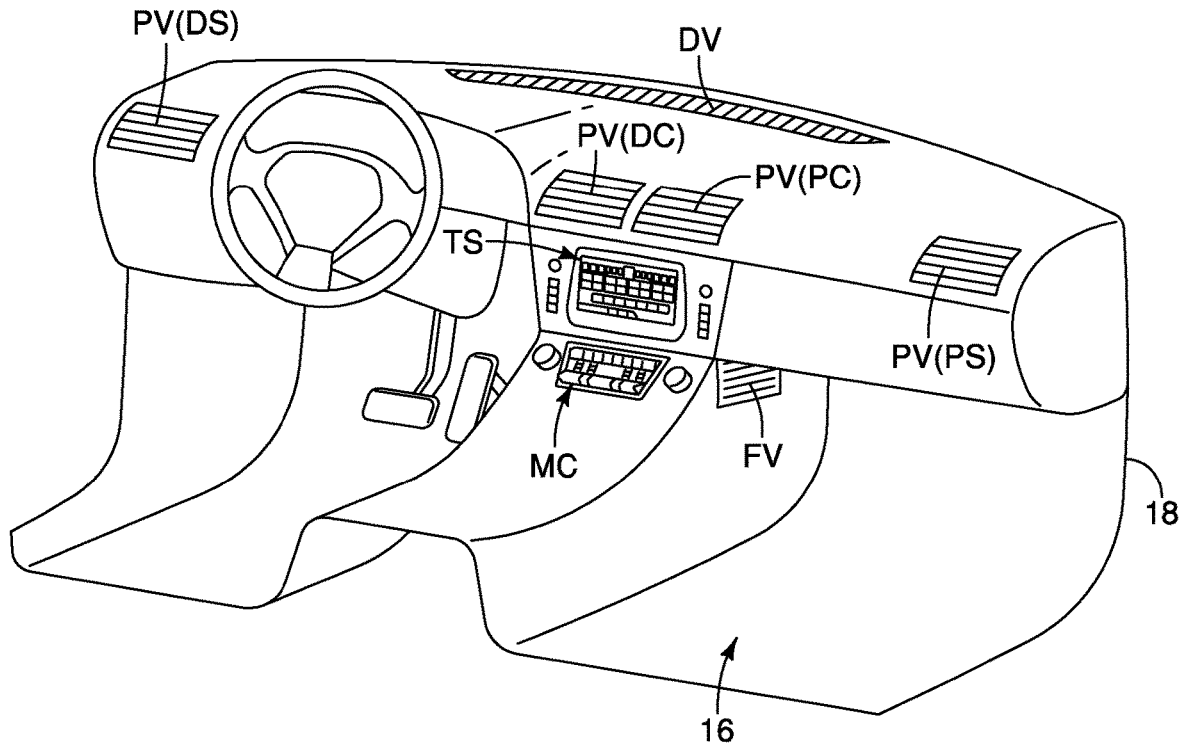
FIG. 2 is a perspective view of a portion of a vehicle passenger compartment of the vehicle illustrated in FIG. 1.

Referring to FIGS. 2-4, there are numerous possible configurations for the one or more panel ventilation mode switch or button(s) 50. In a very simple configuration, a single panel ventilation mode switch or button 50 can be provided which can be pressed to toggle or scroll through all the possible panel ventilation configurations discussed below. As an alternative, two ventilation mode switches or buttons 50 can be provided to toggle back and forth through all the possible panel ventilation configurations discussed below. However, preferably at least one panel ventilation mode switch or button 50 is provided for each of the passenger and the driver. In such a case, each of the passenger side button 50 and the driver side button 50 can pressed to toggle through seven different airflow configurations for each of the driver and the passenger. Since there are seven airflow configurations for each of the driver and passenger, there are a total of 49 total airflow configurations. For this reason, preferably at least one panel ventilation mode switch or button 50 is provided for each of the driver and the passenger.

As an alternative, in the illustrated embodiment, two ventilation mode switches or buttons 50 are be provided for each of the passenger and the driver, as illustrated herein. With this configuration, the driver and the passenger can each toggle back and forth through seven different airflow configurations. In any case, seven different airflow configurations for each of the driver and the passenger are preferably provided, as explained in more detail below. A display 52 is provided on the touch screen TS and adjacent the mechanical climate controls MC in the form of an LCD screen (illustrated), lights or similar indicator for the passenger and the driver to see which airflow configuration is currently selected. Additional information can also be displayed such as set temperature, fan speed, etc.

Referring again to FIGS. 1-6, in the illustrated embodiment, the electronic controller 38 is illustrated as a separate element electrically connected to the user input interface 26. However, the electronic controller 38 can be integrated into the user input interface 26, e.g., the touch screen TS and/or the mechanical climate controls MC. Since the user input interface 26 preferably includes the touch screen TS and the mechanical climate controls MC, the electronic controller 38 is electrically or electronically connected to both the touch screen TS and the mechanical climate controls MC in a conventional manner. In addition, the electronic controller 38 is electrically or electronically connected to the expansion valve EXP, the compressor COM, the heater core, the air blower 34, an actuator or actuators for the defrost duct door 30, a cabin temperature sensor or sensors T and the floor duct doors 32 in a conventional manner as shown in FIG. 5.

The electronic controller 38 is also electrically or electronically connected the air blower 34, the actuation assemblies 36, and the passenger detector system 40 to control the actuation assemblies 36 and the air blower 34 in accordance with the present invention. In particular, each actuation assembly 36 is operatively coupled to a pair of panel duct doors 28 to move the pair of panel duct doors 28 into one of seven airflow configurations as discussed below. Depending on the positions of the panel duct doors 28, the airflow of the air blower 34 can be adjusted in accordance with the present invention as also discussed below. The passenger detector system 40 is conventional as mentioned above. Thus, the passenger detector system 40 preferably includes an occupancy sensor such as a weight sensor disposed in the passenger seat. Although passenger detector systems are conventional, passenger detector systems are typically connected to one or more passenger air bags, not to the climate control system. However, in accordance with the present invention, the passenger detector system 40 is connected to the electronic controller 38 and the information therefrom is used for control, as explained in more detail below.

The air blower 34 will now be discussed in greater detail. As previously stated, the air blower 34 is disposed in or adjacent to the air inlet 44 to move air within the air duct housing 24. The air blower 34 is an HVAC blower that includes a rotary motor and a fan (e.g., a wheel or cage) in a conventional manner. The motor is operatively connected to the electronic controller 38 so that the air blower 34 is operable by the electronical controller 38. In particular, the electronic controller 38 can activate the motor by controlling a voltage applied to the motor to spin the motor, which spins the fan to create airflow. The control of the air blower 34 will be discussed in more detail below.

The electronic controller 38 will now be further discussed. The electronic controller 38 includes a microcomputer with a control program that controls the compressor COM, heater core HC, expansion valve EXP, in accordance with inputs from the user input interface 26 and the control program in a conventional manner. In addition, microcomputer and control program of the electronic controller 38 control the panel duct doors 28 via the actuation assemblies 36, the defrost duct door 30, and the floor duct doors FD in accordance with the present invention. The electronic controller 38 further selectively controls the air blower 34 in accordance with the present invention. While not shown, the electronic controller 38 further includes an input interface circuit for receiving input signals and an output interface circuit for outputting control signals. The electronic controller 38 further includes data storage such as a ROM (Read Only Memory) device and a RAM (Random Access Memory) device for storing the various operating modes and additional operational processes of the vehicle air handling system 12.

It will be apparent to those skilled in the vehicle field from this disclosure that the precise structure and algorithms for the electronic controller 38 can be any combination of hardware and software that will carry out the functions of the present invention. The electronic controller 38 can receive input signals from the components connected thereto such as the user input interface 26, and output control signals to the components connected thereto such as the compressor COM, heater core HC, expansion valve EXP, the actuation assemblies 36, the actuation assembly(s) of the defrost duct door 30 and the floor duct doors FD, and the air blower 34 to control these components. More specifically, the electronic controller 38 can receive and output electronic signals to the components to control the components as disclosed herein.

Figure 7:
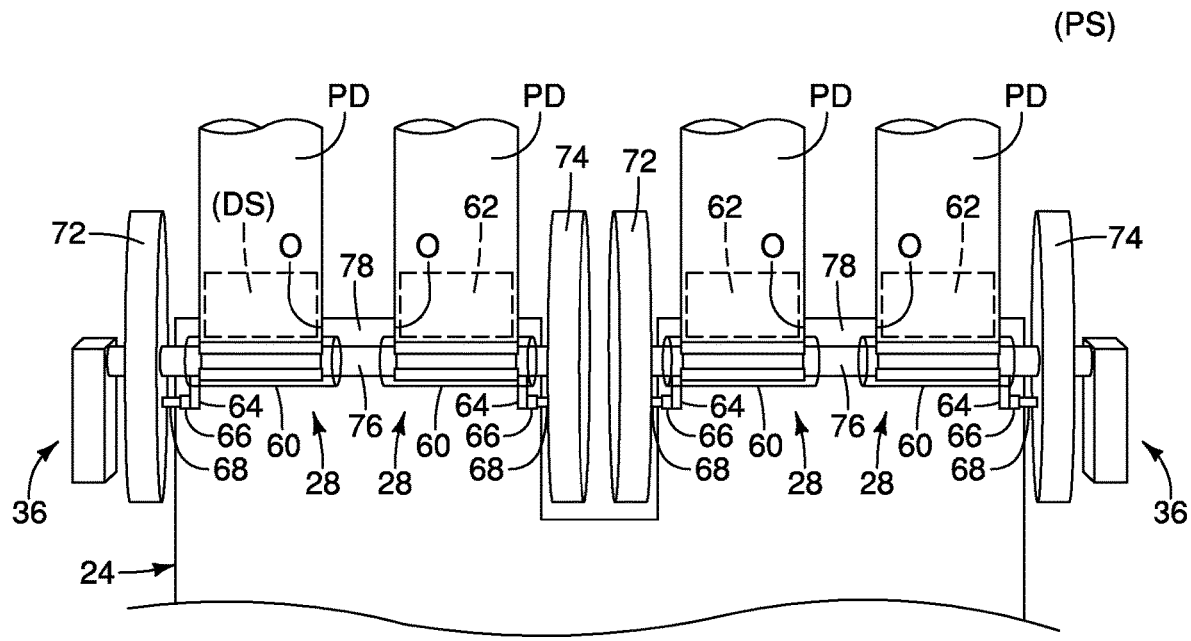
FIG. 7 is a partial schematic elevational view of the casing and ductwork illustrated in FIGS. 1, 5 and 6.
Figure 8:
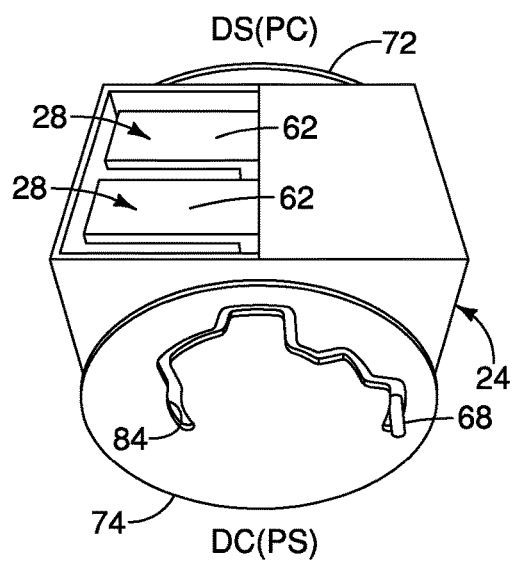
FIG. 8 is a driver center (DC) or passenger side (PS) view of a casing portion and a pair of adjacent duct doors illustrated in FIG. 7.
Figure 9:
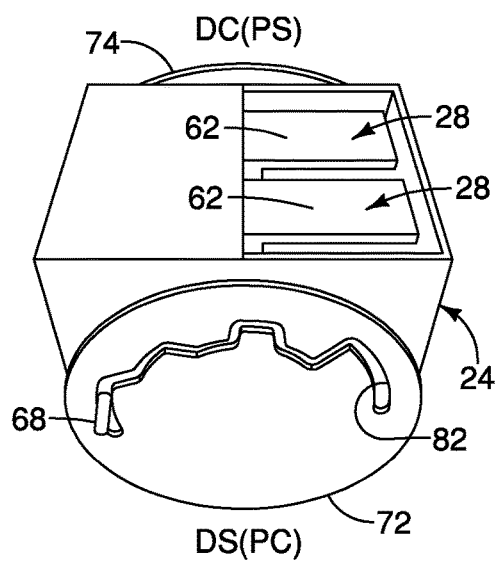
FIG. 9 is a driver side (DS) or passenger center (PC) view of a casing portion and a pair of adjacent duct doors illustrated in FIG. 7.
Figure 10:
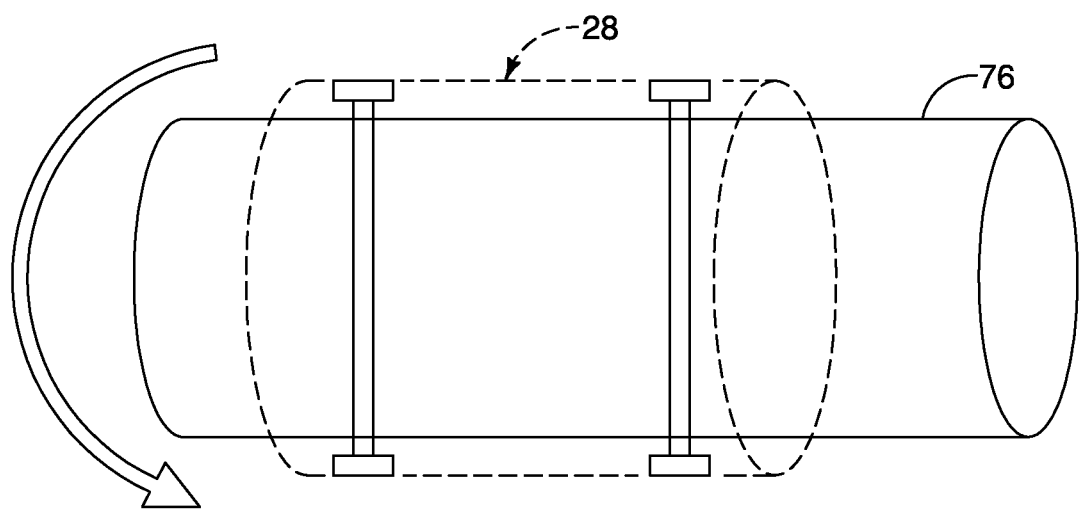
FIG. 10 is a diagrammatic, partial elevational view of one of the duct doors and the shaft illustrated in FIG. 7 rotationally supporting the duct door.

Referring now to FIGS. 2, 5 and 7, the panel ducts PD, the panel duct doors 28 and the actuation assemblies 36 will now be explained in more detail. As shown in FIG. 7, the air duct housing 24 includes four panel ducts PD. The panel ducts PD can be classified as a driver side DS, a driver center DC, passenger center PC and passenger side PS in order from left to right. These panel ducts PD lead to the correspondingly located panel vents PV illustrated in FIG. 2 as understood from FIG. 5. In other words, FIG. 7 is a view of the panel ducts PD from inside the passenger compartment 16. One actuation assembly 36 controls the driver panel duct doors 28 disposed in the driver side DS and driver center DC panel ducts PD. One actuation assembly 36 controls the passenger panel duct doors 28 disposed in the passenger center PC and passenger side PS panel ducts PD.

Referring now to FIGS. 7-11, the driver duct doors 28 disposed in the driver side DS and driver center DC panel ducts PD are identical to and are controlled in a manner identical to the passenger duct doors 28 disposed in the passenger center PC and passenger side PS panel ducts PD. Moreover, the actuation assemblies 36 include identical parts, but slightly different orientations as discussed below. Therefore, it will be apparent to those skilled in the art from this disclosure that the descriptions and illustrations relating to the driver duct doors 28 disposed in the driver side DS and driver center DC panel ducts PD also apply to the passenger duct doors 28 disposed in the passenger center PC and passenger side PS panel ducts PD.

The panel ducts PD and the panel duct doors 28 can be referred to first, second, third, and fourth panel ducts PD and panel duct doors 28 as needed and/or desired. Preferably, the driver ducts PD and driver panel duct doors 28 are considered first and second or third and fourth driver ducts PD and driver doors panel duct 28, respectively. Likewise, preferably, the passenger ducts PD and passenger panel duct doors 28 are considered third and fourth or first and second driver ducts PD and passenger panel duct doors 28. Thus, the first panel duct PD can lead to a side driver vent PV, and the second panel duct PD can lead to a center driver vent PV. However, alternatively, the first panel duct PD can lead to a center passenger vent PV, and the second panel duct PD can lead to a side passenger vent PV.

Regardless, in view of the above configuration, the air duct housing 24 has a third panel duct PD and a fourth panel duct PD (the other of the passenger or driver sides, the at least one air blower 34 conveys the air toward the third and fourth panel ducts PD, and the vehicle air handling system 12 further includes a third panel duct door 28 disposed to selectively open and close the third panel duct PD, a fourth panel duct door 28 disposed to selectively open and close the fourth panel duct PD, and a second panel actuation assembly operatively coupled to the third and fourth panel duct doors 28 to control positions of the third and fourth panel duct doors 28. The first and second actuation assemblies 36 operate independently of the each other.

Therefore, the vehicle air handling system 12 includes a user input interface 26, an air duct housing 24 having an air inlet 44, a first panel duct PD and a second panel duct PD (driver or passenger), a first panel duct door 28 disposed to selectively open and close the first panel duct PD, a second panel duct door 28 disposed to selectively open and close the second panel duct 28, the at least one air blower 34, a first panel actuation assembly 36. The air blower 34 draws air into the air duct housing 24 via the air inlet 44 and conveys the air toward the first and second panel ducts PD. The first panel actuation assembly 36 is operatively coupled to the first and second panel duct doors 28 to simultaneously control positions of the first and second panel duct doors 28 in response to operation of the user input interface 26 between a plurality of settings. The settings correspond to the seven different airflow configurations. Thus, the positions of the first and second panel duct doors 28 include at least one setting in which different airflow volumes are passed by the first and second panel duct doors 28, as explained in more detail below.

As best seen in FIG. 7, each panel duct door 28 includes a support portion 60, a flap 62, link portion 64 and a control arm 66 with a pin 68 extending from a free end of the control arm 66. The support portion 60, the flap 62 link portion 64 are preferably fixedly attached to each other to move together. These parts can be integrally formed together as a one-piece unitary member or can be formed by 2 or more separate pieces fixed to each other. The control arm 66 is pivotally attached to an end of the link portion 64 spaced from the pivot axis of the support portion 60. The pin 68 is fixedly attached or rotationally attached to an end of the control arm 66 remote from the link portion 64. While the control arm 66 and pin 68 are described as part of the panel duct door 28, it will be apparent that these parts could be considered parts of the actuation assembly 36, or could be considered intermediary parts disposed between the panel duct door 28 and the actuation assembly 36. The material of the panel doors 28 can be plastic for example. Adjacent driver panel duct doors 28 are mirror images of each other. Likewise, adjacent passenger panel duct doors 28 are mirror images of each other. The control arms 66 cooperate with the actuation assemblies 36 to move the panel duct doors 28 as explained below.

Figure 11:
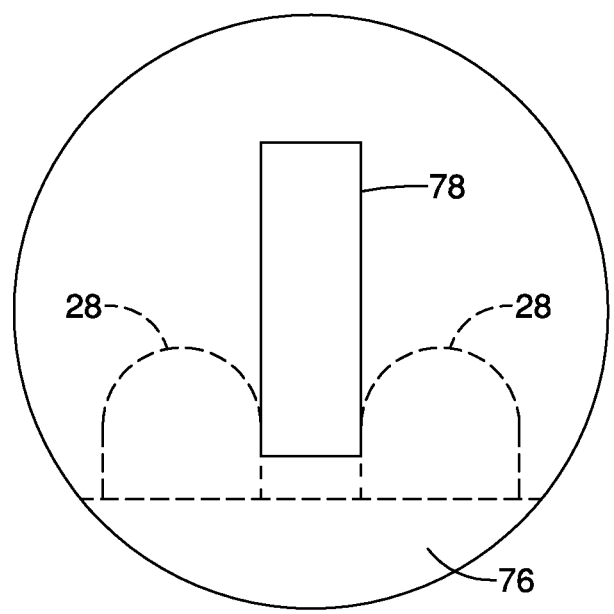
FIG. 11 is an enlarged simplified diagrammatic illustration of a pair of duct doors illustrated in FIG. 7, with a guide disposed therebetween.

Each actuation assembly 36 includes an actuator 70, a first control link 72, a second control link 74 and a shaft 76 non-rotatably attaching the first and second control links 72 and 74 to each other. The panel duct doors 28 are rotatably supported on the shafts 76. Specifically, the support portions 60 of the panel duct doors 28 are rotatably supported on the shafts 76. The actuator 70 is attached to the driver side DS first control link 72 or the passenger side PS second control link 74. The actuator 70 rotates the control links 72 and 74 connected thereto by rotating one of the control links 72 or 74 or one of the shafts 76. In the illustrated embodiment, the actuator 70 is a reversible motor. As shown in FIG. 7, the actuator 36 rotates shaft 76 and control links 72 and 74. When control link 72 rotates, slot 82 rotates and pin 68 follows in the slot 82. Pin 68 will turn doors 28, and doors 28 have flanges 78 extending inward to shaft 76. The flanges 78 are greased and move within a channel on door 28 as shown in FIG. 11.

Figure 12:
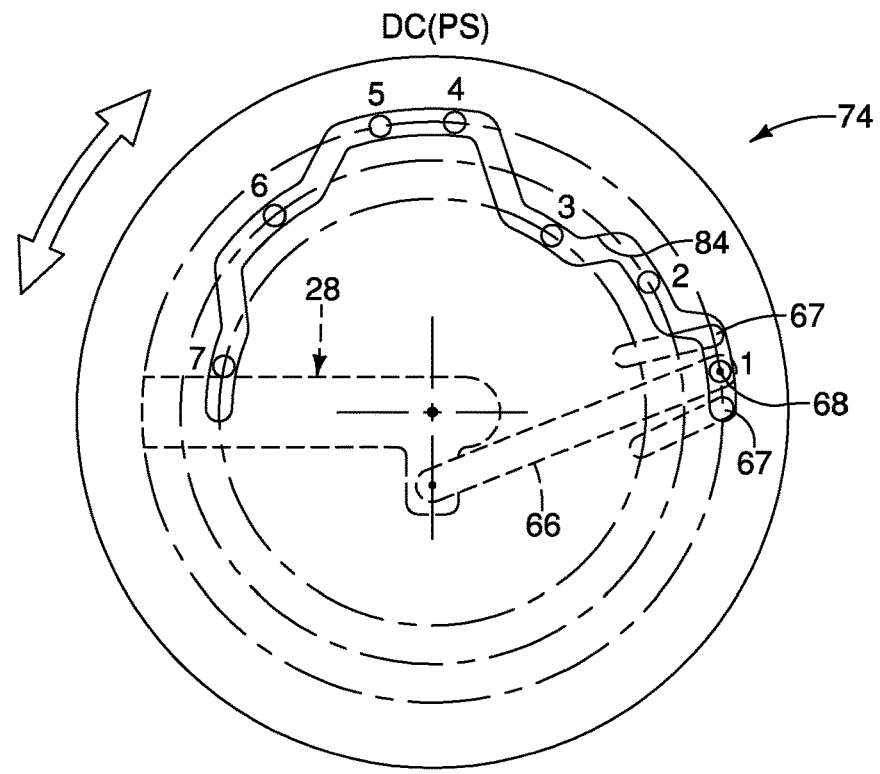
FIG. 12 is a driver center (DC) or passenger side (PS) view of a driver center (DC) or passenger side (PC) control link of an actuation assembly of one side of the casing and ductwork illustrated in FIG. 7.
Figure 13:
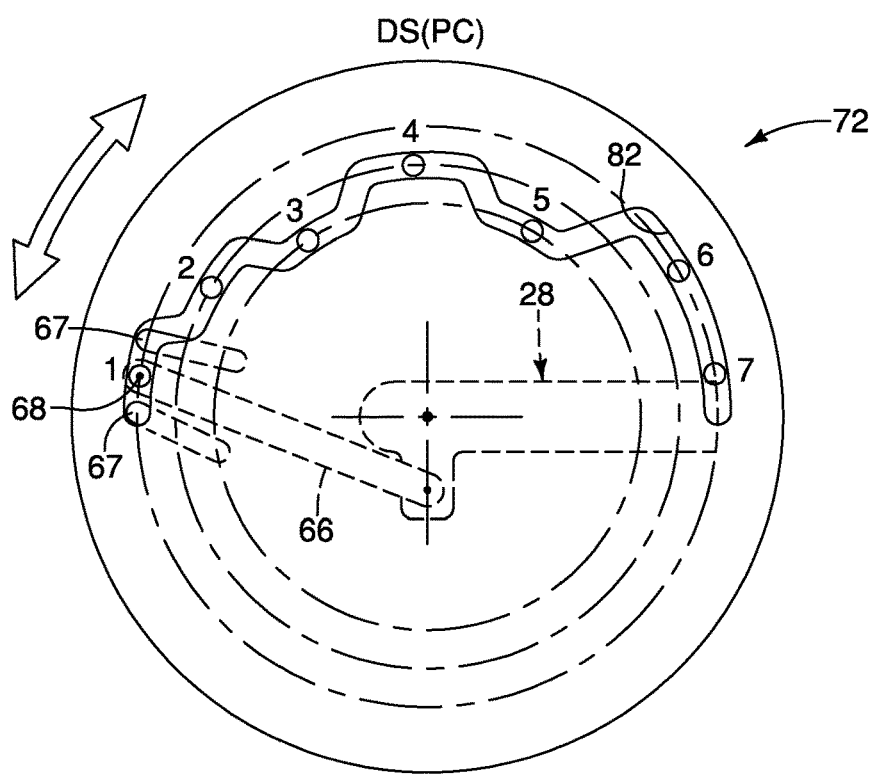
FIG. 13 is a driver side (DS) or passenger center (PC) view of a driver side (DS) or passenger center (PC) control link of an actuation assembly of one side of the casing and ductwork illustrated in FIG. 7.

Referring again to FIGS. 7-13, the control link 72 has a cam slot 82, and the control link 74 has a cam slot 84. The cam slots 82 and 84 cooperate with the pins 68 of adjacent driver panel duct doors 28 and the pins of adjacent passenger duct doors 28 to selectively position adjacent panel duct doors 28 in seven different airflow configurations. More specifically, each cam slot 82 and 84 includes seven different arc-shaped areas corresponding to seven different pin positions that are connected by transition areas as best understood from FIGS. 12 and 13. Each arc-shaped area is disposed at one of three radial positions. The end of the control arm 66 remote from the link portion 64 or the pin 68 is substantially prevented from moving circumferentially around the pivot axis of the shafts 76 by a pair of guide elements 67 non-movable relative to the casing 24. The guide elements 67 are best shown in FIGS. 12-13. Therefore, when either actuator 70 rotates the control links 72 and 74, the pins 68 will move between the seven different arc-shaped areas. The seven different positions are located at the three different radii corresponding to closed, partially open and fully open positions of the panel duct doors 28 in different orders, as explained in more detail below. While in the illustrated embodiment the control arms 66 have the pins 68 and the control links 72 and 74 have the cam slots 82 and 84, respectively, it will be apparent to those skilled in the art from this disclosure that these arrangements could be reversed if needed and/or desired.

In view of the above configuration, the first (driver or passenger) panel actuation assembly 36 includes a first control link 72 or 74, a second control link 74 or 72 non rotatably attached to the first control link 72 or 74, and a first actuator 70 operatively coupled to the first and second control links 72 and 74 to rotationally move the first and second control links 72 and 74. The first duct door 28 is rotationally mounted relative to the first control link 72 or 74, and the first duct door 28 includes a first positioning arm 66 cooperating with the first control link 72 or 74 to position the first duct door 28 in different positions in response to rotation of the first control link 72 or 74. Likewise, the second duct door 28 is rotationally mounted relative to the second control link 74 or 72, and the second duct door 28 includes a second positioning arm 66 cooperating with the second control link 74 or 72 to position the second duct door 28 in different positions in response to rotation of the second control link 74 or 72. The driver side and driver center panel duct doors 28 can be considered the first and second duct doors 28, and vice versa. Likewise, the passenger side and passenger center panel duct doors 28 can be considered the first and second duct doors 28, and vice versa. Similarly, either of the control links 72 and 74 can be considered the first control link, and the other of the control links 74 and 72 can be considered the second control link.

Referring still to FIGS. 7-13, the first and second (e.g., driver or passenger) duct doors 28 are rotationally supported by a first shaft (one of the shafts 76) attached to the first and second control links 72 and 74. One of the first arm 66 and the first control link 72 or 74 includes a first slot 82 or 84 and an other of the first arm 68 and the first control link 72 and 74 includes a first pin 68 disposed in the first slot 82 or 84, and one of the second arm 66 and the second control link 74 or 72 includes a second slot 84 or 82 and an other of the second arm 66 and the second control link 74 or 72 includes a second pin 68 disposed in the second slot 84 or 82. In the illustrated embodiment, the first control link 72 or 74 includes the first slot 82 or 84 and the first arm 66 includes the first pin 68, and the second control link 74 or 72 includes the second slot 84 or 82 and the second arm 66 includes the second pin 68.

In the illustrated embodiment, the first and second control links 72 and 74 are longitudinally spaced from each other along a first shaft (one of the shafts 76), and the first and second duct doors 28 are mounted longitudinally between the first and second control links 72 and 74 on the shaft 76. The first actuator 70 is operatively coupled to one of the first and second control links 72 or 74 to rotate the first and second control links 72 and 74. Specifically, on the driver side, the actuator 70 is operatively coupled to the control link 72, and on the passenger side the actuator 70 is operatively coupled to the control link 74. In the illustrated embodiment, the first actuator 70 includes an electric motor that rotates the first and second control links 72 and 74 in response to operation of the user input interface 26.

Referring now to FIGS. 14-35, movement of adjacent driver/passenger panel duct doors 28 will now be explained. FIGS. 14-34 illustrate the seven positions of each of the pairs of adjacent driver/passenger panel duct doors 28, control links 72 and control links 74. It will be apparent to those skilled in the art from this disclosure that the descriptions and illustrations of pair of duct doors 28 in FIGS. 14-34 can be either the driver panel duct doors 28 or the passenger panel duct doors 28. FIG. 35 illustrates the seven possible air configurations for the adjacent driver/passenger panel duct doors 28. Since each adjacent pair of panel duct doors 28 has seven possible airflow configurations usable with the seven possible airflow configurations of the other adjacent pair of panel duct doors 28. Pair of adjacent panel duct doors 28 as used herein is intended to refer to panel duct doors 28 that are controlled by a common actuation assembly 36.

Figure 14:
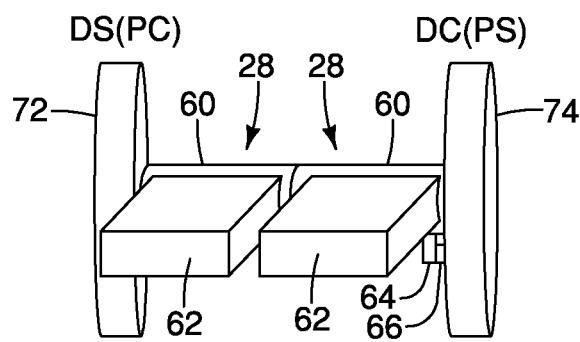
FIG. 14 is schematic elevational view of driver side (DS) and driver center (DC), or passenger center (PC) and passenger side (PS) duct doors and control links illustrated in FIGS. 7-13, with duct doors in closed and closed positions.
Figure 15:
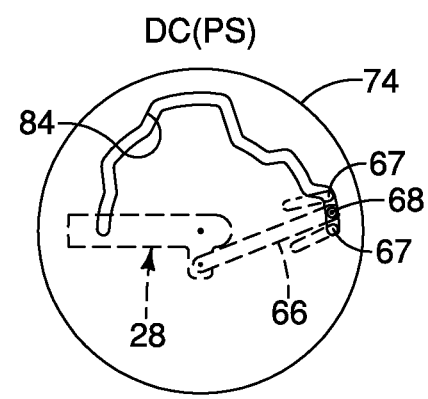
FIG. 15 is a right side elevational view of the driver center (DC) or passenger side (PS) control link illustrated in FIG. 14.
Figure 16:
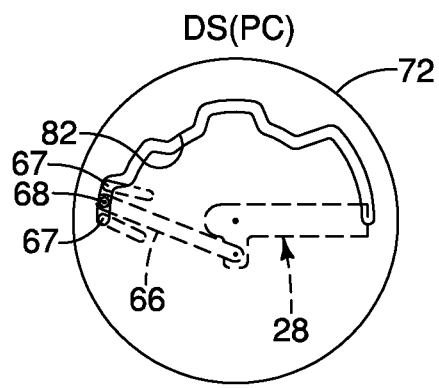
FIG. 16 is a left side elevational view of the driver side (DS) or passenger center (PC) control link illustrated in FIG. 14.

FIG. 14-16 illustrate driver side (DS) and driver center (DC), or passenger center (PC) and passenger side (PS) duct doors 28 and control links 72 and 74 with duct doors 28 in closed and closed positions, a first airflow configuration.

Figure 17:
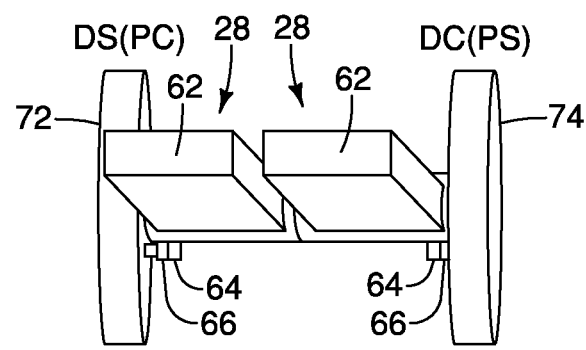
FIG. 17 is schematic elevational view of driver side (DS) and driver center (DC), or passenger center (PC) and passenger side (PS) duct doors and control links illustrated in FIGS. 7-13, with duct doors in partially open and partially open positions.
Figure 18:
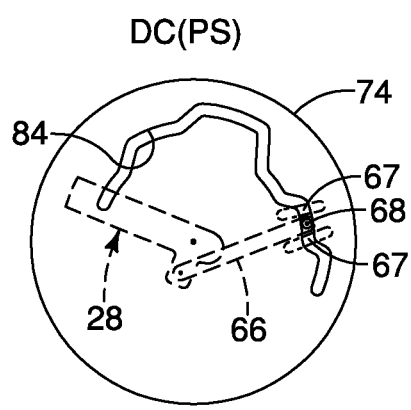
FIG. 18 is a right side elevational view of the driver center (DC) or passenger side (PS) control link illustrated in FIG. 17.
Figure 19:
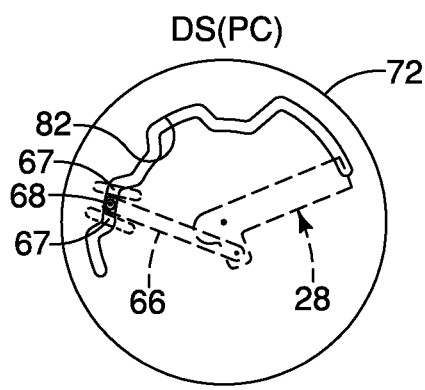
FIG. 19 is a left side elevational view of the driver side (DS) or passenger center (PC) control link illustrated in FIG. 17.

FIGS. 17-19 illustrate driver side (DS) and driver center (DC), or passenger center (PC) and passenger side (PS) duct doors 28 and control links 72 and 74 with duct doors 28 in partially open and partially open positions, a second airflow configuration.

FIGS. 20-22 illustrate driver side (DS) and driver center (DC), or passenger center (PC) and passenger side (PS) duct doors 28 and control links 72 and 74 with duct doors 28 in fully open and fully open positions, a third airflow configuration.

FIGS. 23-25 illustrate driver side (DS) and driver center (DC), or passenger center (PC) and passenger side (PS) duct doors 28 and control links 72 and 74 with duct doors 28 in partially open and closed positions, a fourth airflow configuration.

Figure 26:
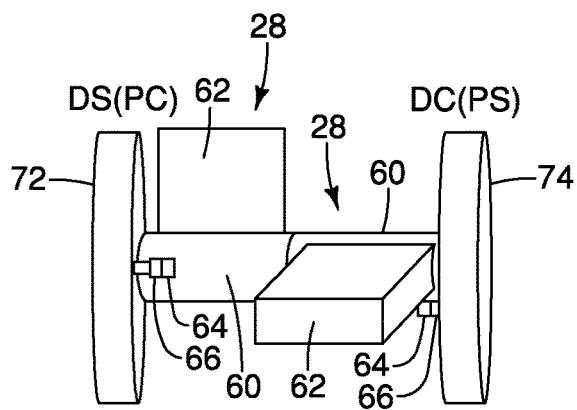
FIG. 26 is schematic elevational view of driver side (DS) and driver center (DC), or passenger center (PC) and passenger side (PS) duct doors and control links illustrated in FIGS. 7-13, with duct doors in fully open and closed positions.
Figure 27:
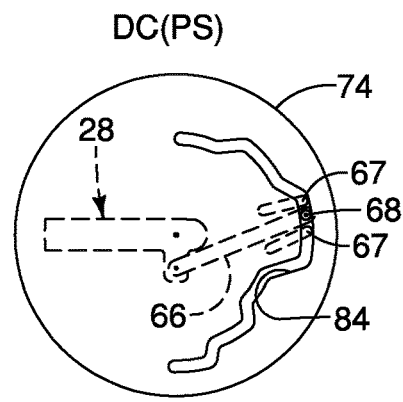
FIG. 27 is a right side elevational view of the driver center (DC) or passenger side (PS) control link illustrated in FIG. 26.
Figure 28:
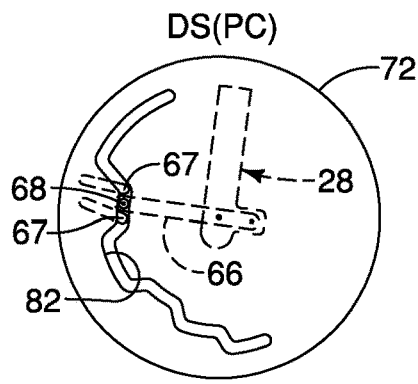
FIG. 28 is a left side elevational view of the driver side (DS) or passenger center (PC) control link illustrated in FIG. 26.

FIGS. 26-28 illustrate driver side (DS) and driver center (DC), or passenger center (PC) and passenger side (PS) duct doors 28 and control links 72 and 74 with duct doors 28 in fully open and closed positions, a fifth airflow configuration.

Figure 29:
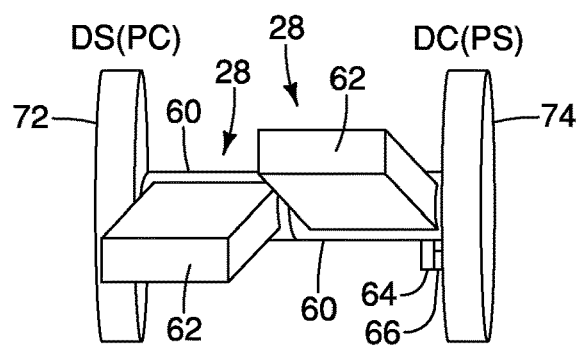
FIG. 29 is schematic elevational view of driver side (DS) and driver center (DC), or passenger center (PC) and passenger side (PS) duct doors and control links illustrated in FIGS. 7-13, with duct doors in closed and partially open positions.
Figure 30:
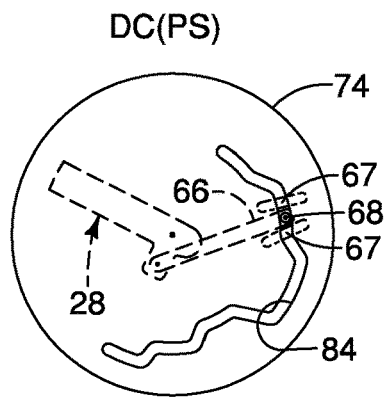
FIG. 30 is a right side elevational view of the driver center (DC) or passenger side (PS) control link illustrated in FIG. 29.
Figure 31:
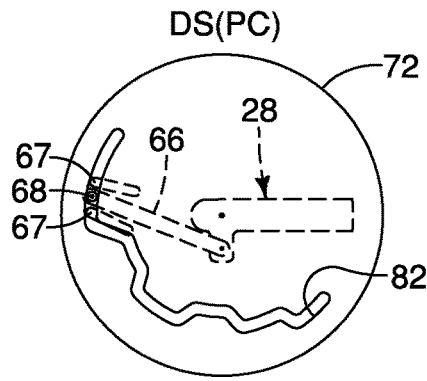
FIG. 31 is a left side elevational view of the driver side (DS) or passenger center (PC) control link illustrated in FIG. 29.

FIGS. 29-31 illustrate driver side (DS) and driver center (DC), or passenger center (PC) and passenger side (PS) duct doors 28 and control links 72 and 74 with duct doors 28 in closed and partially open positions, a sixth airflow configuration.

FIGS. 32-34 illustrate driver side (DS) and driver center (DC), or passenger center (PC) and passenger side (PS) duct doors 28 and control links 72 and 74 with duct doors 28 in closed and fully open positions, a seventh airflow configuration.

In view of the above configuration, a first panel duct door 28 is positionable in at least a first closed position, a first fully open position and a first partially open position in response to rotation of the first control link 72 or 74, and a second panel duct door 28 is positionable in at least a second closed position, a second fully open position and a second partially open position in response to rotation of the second control link 74 or 72. The first and second panel duct doors 28 can be driver side (DS) and driver center (DC), or vice versa. Likewise, the first and second panel duct doors 28 can be passenger center (PC) and passenger side (PS), or vice versa.

Moreover, in view of the above configuration, the plurality of settings include at least two settings in which different airflow volumes are passed by the first and second panel duct doors 28, and at least two settings in which same airflow volumes are passed by the first and second panel duct doors 28. Preferably, the plurality of settings include four settings in which different airflow volumes are passed by the first and second panel duct doors 28, and three settings in which same airflow volumes are passed by the first and second panel duct doors 28. This can be clearly understood by the above explanation of FIGS. 14-34.

In the illustrated embodiment, the plurality of settings include a first setting in which the first and second panel duct doors 28 are closed (FIGS. 14-16), a second setting in which the first and second panel duct doors 28 are partially open (FIGS. 17-19), a third setting in which the first and second panel duct doors 28 are fully open (FIGS. 20-22), a fourth setting in which the first panel duct door 28 is partially open and the second panel duct door 28 is closed (FIGS. 23-25), a fifth setting in which the first panel duct door 28 is fully open and the second panel duct door 28 is closed (FIGS. 26-28), a sixth setting in which the first panel duct door 28 is closed and the second panel duct door 28 is partially open (FIGS. 29-31), and a seventh setting in which the first panel duct door 28 is closed and the second panel duct door 28 is fully open (FIGS. 32-34).

Figure 36:
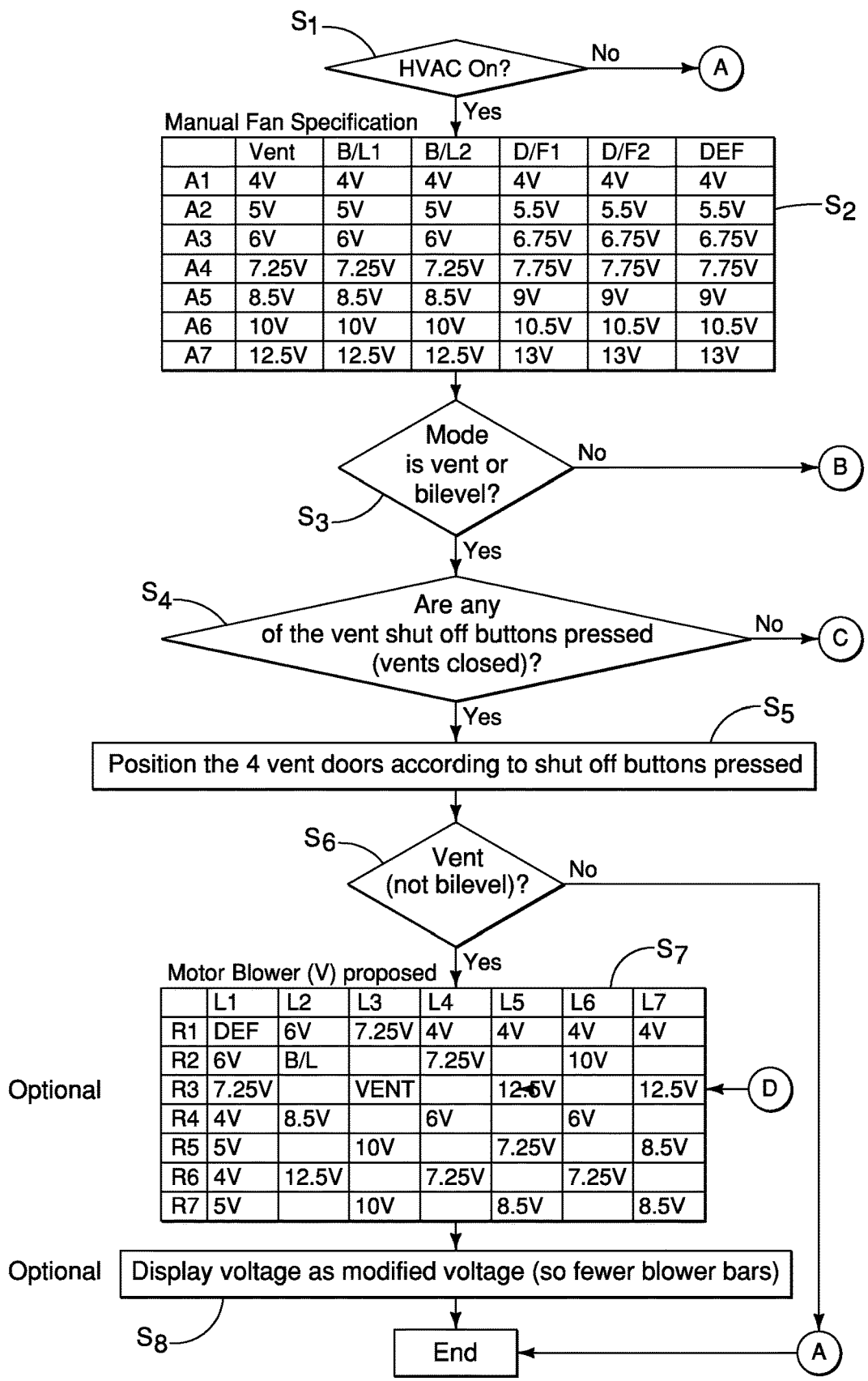
FIGS. 36 and 37 are portions of a flow chart illustrating how the airflow rate is controlled by the electronic controller.
Figure 37:
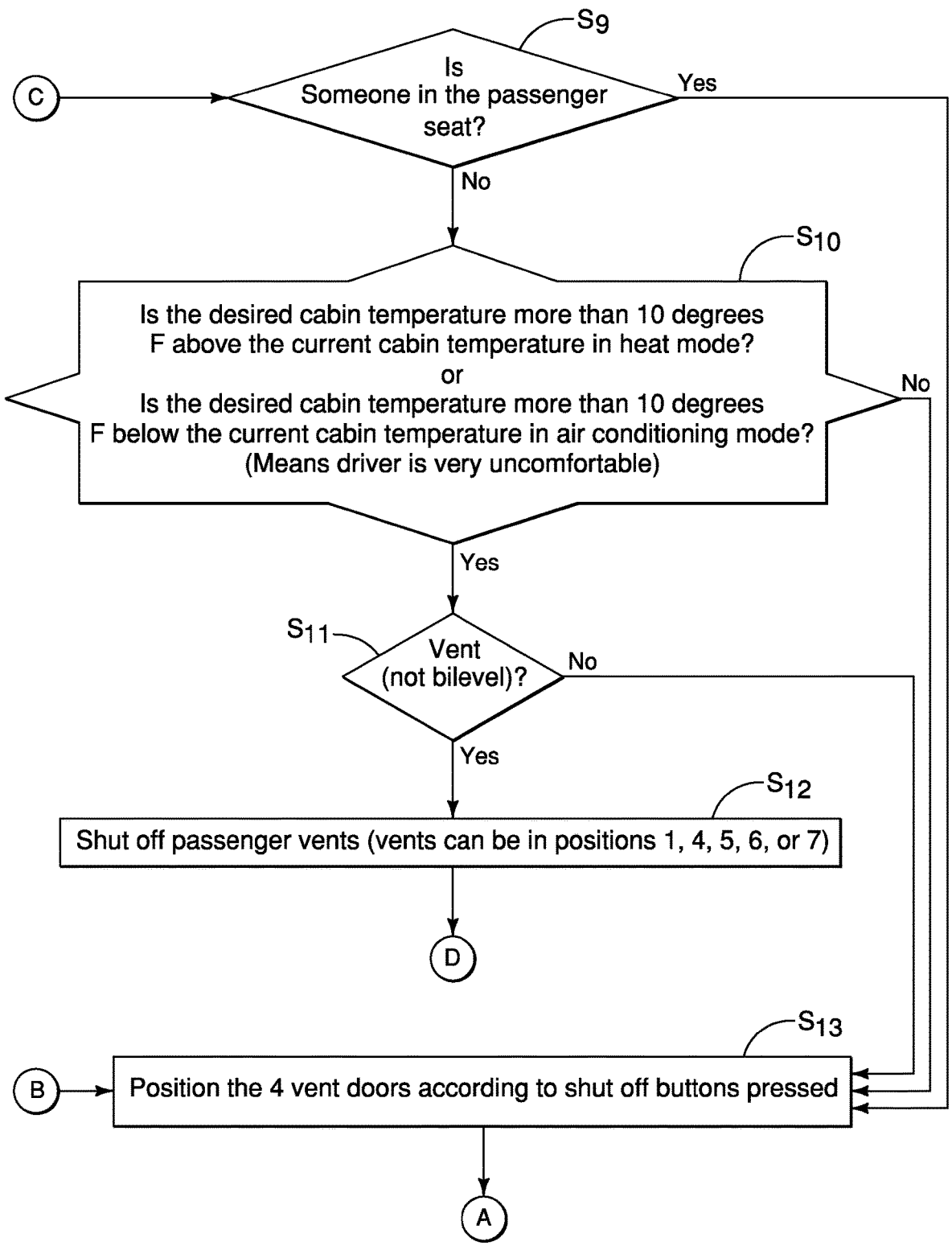

Referring now to FIGS. 36-37, control of the vehicle air handling system 12 in accordance with the present invention will now be explained in more detail with reference to the flow chart shown in FIGS. 36-37. As can be understood from the Figures, there are 13 logic blocks $S_1$-$S_{13}$. The diamond shaped blocks are decision blocks in which two results are possible. The rectangular blocks are command blocks which execute the operation stated therein and proceed to the next block. The flow chart shown in FIGS. 36-37 should be understandable to those of ordinary skill in the art from this disclosure without repeating the logic herein. Therefore, the logic disclosed in the flow chart shown in FIGS. 36-37 will be discussed briefly herein for the sake of brevity. The electronic controller executes a control program in order to carry out the logic of FIGS. 36-37, and receives/sends the appropriate electrical or electronic signals to carry out the logic.

First, in a decision block $S_1$ the electronic controller 38 determines if the HVAC is on. If not the logic proceeds to the End. If so, the control logic proceeds to command block $S_2$ and sets the blower voltage according to the chart. The control logic then proceeds to decision block $S_3$. If the mode is vent or bilevel, the logic proceeds to decision block $S_4$. If, not the control logic proceeds to command block $S_{13}$ in FIG. 37 and then End. In decision block $S_4$ it is determined if any of the panel duct doors 28 are closed. If not, the logic proceeds to decision block $S_9$, discussed later. If so, the logic proceeds to the command block $S_5$ and then to decision block $S_6$. In decision block $S_6$ it determined if the vent mode (not bilevel) or panel mode alone is active. If not, the control logic proceeds to the End. If so, the control logic proceeds to the optional command block $S_7$ and then to the optional command block $S_8$. Optionally the motor blower 34 can be set according to the chart and the set fan speed can be displayed in accordance with these optional command blocks. Then the logic proceeds to end.

Referring to FIG. 37, at decision block $S_9$, it is determined if there is a passenger in the passenger seat. If so, the control logic proceeds to the command block $S_{13}$ and then End. If not, the control logic proceeds to the decision block $S_{10}$ in which it is determined if the cabin temperature is very uncomfortable. If not, the control logic proceeds to the command block $S_{13}$ and then End. If so, the control logic proceeds to the decision block $S_{11}$ in which it is determined if the vent mode (not bilevel) or panel alone is selected. If not, the control logic proceeds to the command block $S_{13}$ and then End. If so, the control logic proceeds to the command block $S_{12}$ and back to the optional command block $S_7$ and then to the optional command block $S_8$. Optionally the motor blower 34 can be set according to the chart and the set fan speed can be displayed in accordance with these optional command blocks. Then the logic proceeds to end.

Second Embodiment

Figure 38:
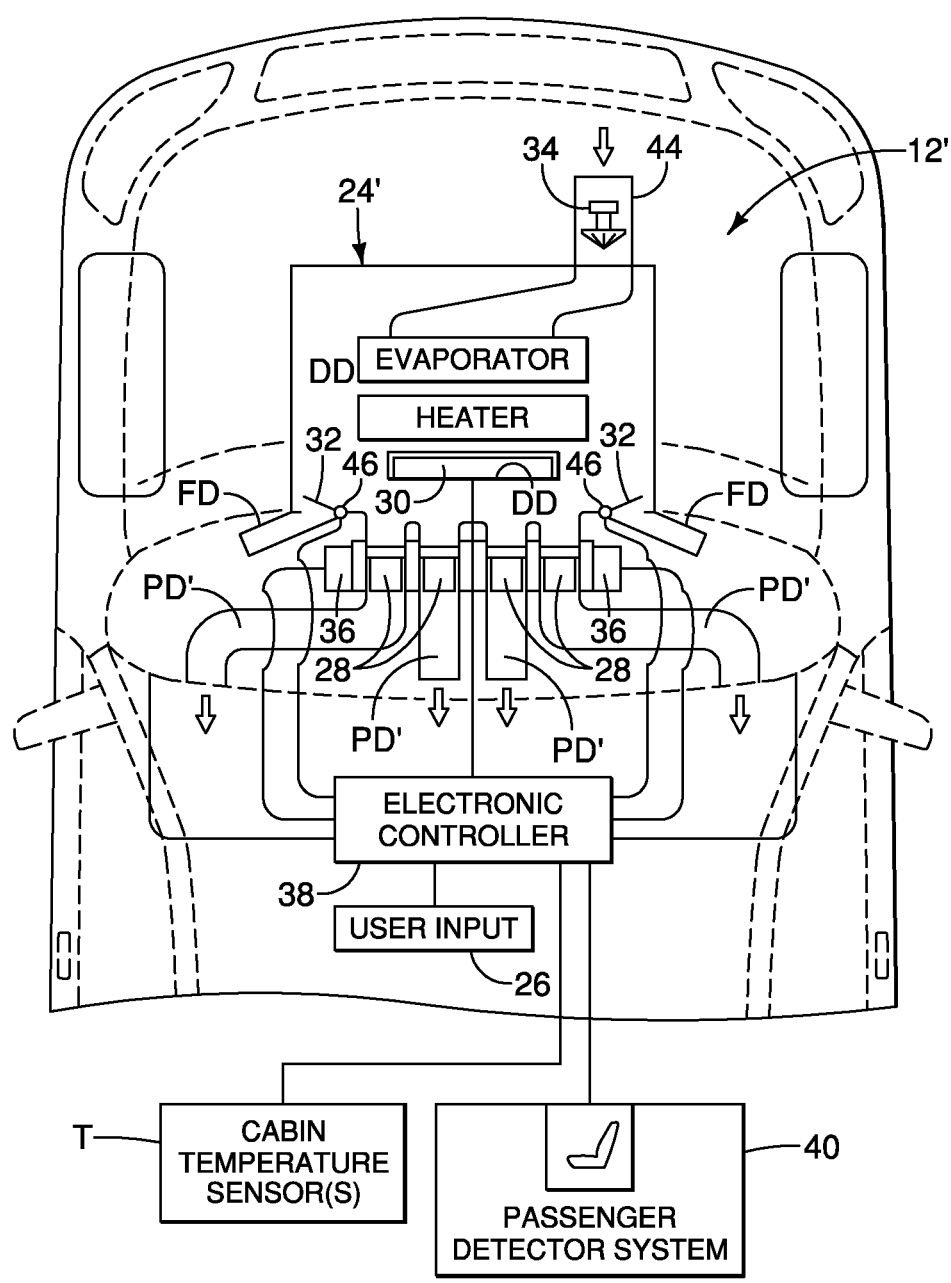
FIG. 38 is a schematic top plan view of a vehicle, with ductwork and other parts of a vehicle air handling system in accordance with a second embodiment being diagrammatically shown.
Figure 39:
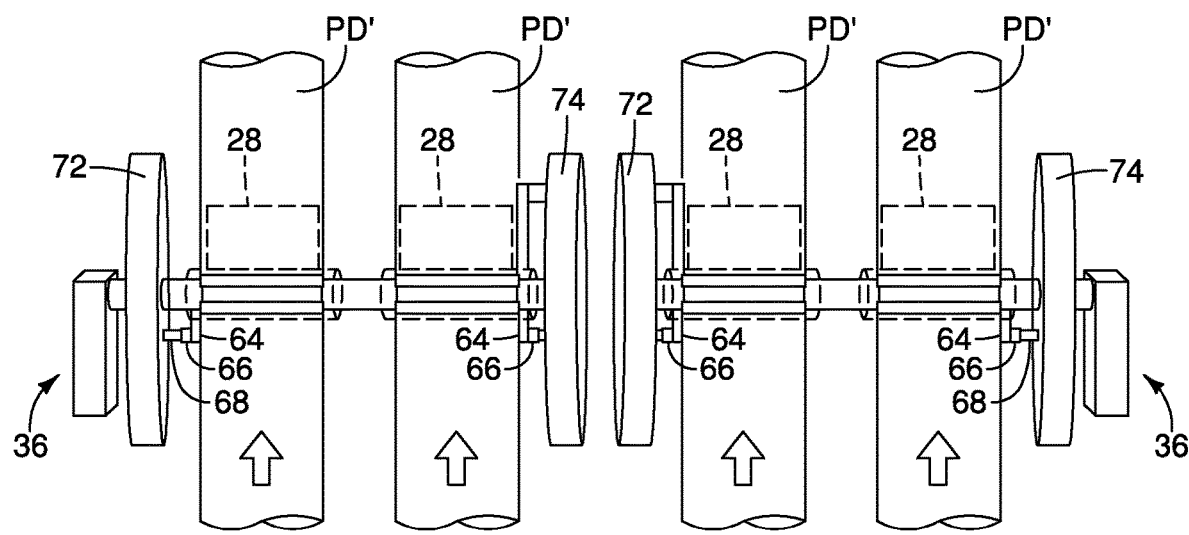
FIG. 39 is a partial schematic elevational view of the casing and ductwork illustrated in FIG. 38.
Figure 40:
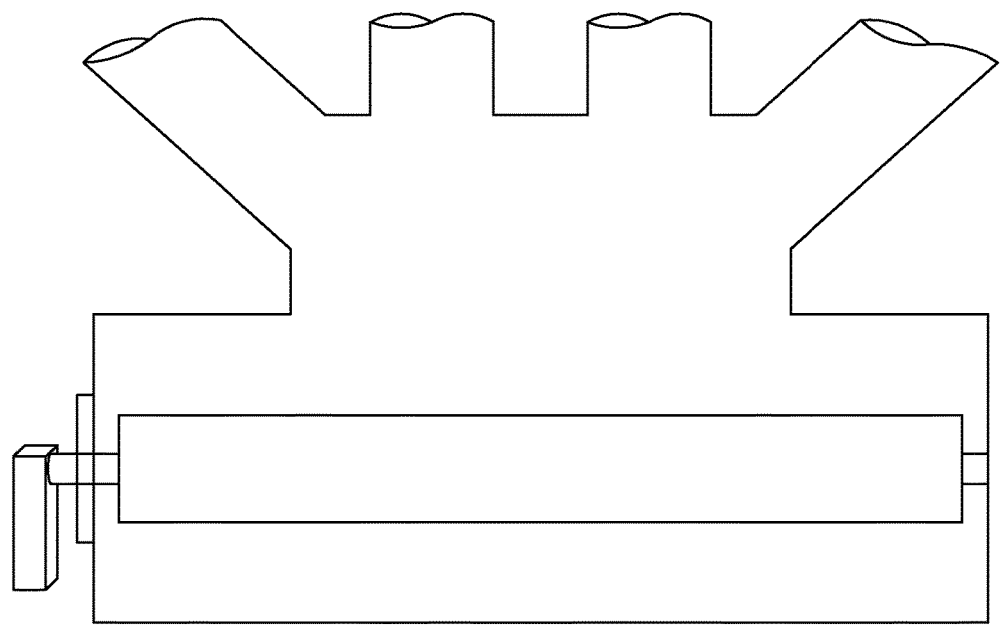
FIG. 40 is a prior art illustration of a mode door controlling airflow to four panel ducts.

Referring now to FIGS. 38 and 39, a vehicle air handling system 12' including an air duct housing 24' in accordance with a second embodiment will now be explained. The vehicle air handling system 12' of this second embodiment is identical to the air handling system 12 of the first embodiment, except that the air duct housing 24' of this second embodiment is a modified version of the air duct housing 24 of the first embodiment. Therefore, it will be apparent to those having ordinary skill in the art from this disclosure that the descriptions and illustrations of the first embodiment also apply to this second embodiment, except as explained and illustrated herein. Moreover, parts of this second embodiment, if identified in FIGS. 37-38, that are identical to parts of the first embodiment will be given the same reference numerals for the sake of convenience. Moreover, the descriptions of the parts of the second embodiment that are identical to the parts of the first embodiment may be omitted for the sake of brevity. The parts of the second embodiment that differ from the parts of the first embodiment will be indicated with a single prime (').

The air duct housing 24' a modified HVAC case 40' and modified panel ducts PD' with longer connecting ends at the HVAC case 40'. The panel duct doors 28 are mounted within these modified panel ducts PD'. In the first embodiment, the panel duct doors 28 are mounted with the HVAC case 40. Therefore, the HVAC case 40' omits the structure needed to mount the actuation assemblies 36 and the panel duct doors 28, because these parts are now mounted to the modified panel ducts PD'. In addition, the flanges 78 from the first embodiment can be eliminated because the panel ducts PD' perform the spacing function.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle air handling system. Accordingly, these terms, as utilized to describe the present invention should be interpreted relative to a vehicle equipped with the vehicle air handling system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

The terms first, second, third, fourth, etc. can be used interchangeably herein unless specified otherwise.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle air handling system comprising:
a user input interface;
an air duct housing having an air inlet, a first panel duct leading from the housing to a first panel vent, and a second panel duct leading from the housing to a second panel vent, the first and second panel vents being disposed between the first and second panel ducts and an interior of a passenger compartment;
a first panel duct door disposed to selectively open and close the first panel duct;
a second panel duct door disposed to selectively open and close the second panel duct;
at least one air blower drawing air into the air duct housing via the air inlet and conveying the air toward the first and second panel ducts, the first panel duct door being disposed between the first panel vent and the at least one air blower such that air flowing out of the first panel vent into the interior of a passenger compartment must first pass by the first panel duct door, and the second panel duct door being disposed between the second panel vent and the at least one air blower such that air flowing out of the second panel vent into the interior of a passenger compartment must first pass by the second panel duct door; and
a first panel actuation assembly operatively coupled to the first and second panel duct doors to simultaneously control positions of the first and second panel duct doors in response to operation of the user input interface between a plurality of settings,
the positions of the first and second panel duct doors including at least one setting in which different airflow volumes are passed by the first and second panel duct doors,
the first panel actuation assembly including a first control link, a second control link non rotatably attached to the first control link, and a first actuator operatively coupled to the first and second control links to rotationally move the first and second control links,
the first duct door being rotationally mounted relative to the first control link, and the first duct door including a first positioning arm cooperating with the first control link to position the first duct door in different positions in response to rotation of the first control link;
the second duct door being rotationally mounted relative to the second control link, and the second duct door including a second positioning arm cooperating with the second control link to position the second duct door in different positions in response to rotation of the second control link,
the first and second duct doors being rotationally supported by a first shaft attached to the first and second control links, and
the first and second panel duct doors being rotatable about a common axis.

2. The vehicle air handling system according to claim 1, wherein
the first panel vent is a side driver vent, and the second panel vent is a center driver vent.

3. The vehicle air handling system according to claim 1, wherein
the first panel vent is a center passenger vent, and the second panel vent is a side passenger vent.

4. The vehicle air handling system according to claim 1, wherein
the air duct housing has a third panel duct leading from the housing to a third panel vent, and a fourth panel duct leading from the housing to a fourth panel vent, the third and fourth panel vents being disposed between the third and fourth panel ducts and the interior of the passenger compartment,
the at least one air blower conveys the air toward the third and fourth panel ducts, and
the vehicle air handling system further comprises:
a third panel duct door disposed to selectively open and close the third panel duct;
a fourth panel duct door disposed to selectively open and close the fourth panel duct; and
a second panel actuation assembly operatively coupled to the third and fourth panel duct doors to control positions of the third and fourth panel duct doors, the third panel duct door being disposed between the third panel vent and the at least one air blower such that air flowing out of the third panel vent into the interior of the passenger compartment must first pass by the third panel duct door, and the fourth panel duct door being disposed between the fourth panel vent and the at least one air blower such that air flowing out of the fourth panel vent into the interior of the passenger compartment must first pass by the fourth panel duct door, and
the third panel duct door controlling a degree of opening of the third panel duct leading to the third panel vent without controlling a degree of opening of the fourth panel duct leading to the fourth panel vent, and the fourth panel duct door controlling the degree of opening of the fourth panel duct leading to the fourth panel vent without controlling the degree of opening of the third panel duct leading to the third panel vent.

5. The vehicle air handling system according to claim 4, wherein
the second panel actuation assembly operates independently of the first panel actuation assembly.

6. The vehicle air handling system according to claim 1, wherein
the air duct housing has a floor duct, the at least one air blower conveys the air toward the floor duct, and the vehicle air handling system further comprises
a floor duct door disposed to selectively open and close the floor duct; and
an auxiliary actuator operatively coupled to floor duct door to control position of the floor duct door.

7. The vehicle air handling system according to claim 6, wherein
the air duct housing has a defrost duct, the at least one air blower conveys the air toward the defrost duct, and the vehicle air handling system further comprises
a defrost duct door disposed to selectively open and close the defrost duct, the auxiliary actuator being operatively coupled to defrost duct door to control position of the defrost duct door.

8. The vehicle air handling system according to claim 1, wherein
the air duct housing has a defrost duct, the at least one air blower conveys the air toward the defrost duct, and the vehicle air handling system further comprises a defrost duct door disposed to selectively open and close the defrost duct; and an auxiliary actuator operatively coupled to defrost duct door to control position of the defrost duct door.

9. The vehicle air handling system according to claim 1, wherein
one of the first arm and the first control link includes a first slot and an other of the first arm and the first control link includes a first pin disposed in the first slot, and
one of the second arm and the second control link includes a second slot and an other of the second arm and the second control link includes a second pin disposed in the second slot.

10. The vehicle air handling system according to claim 9, wherein
the first control link includes the first slot and the first arm includes the first pin, and
the second control link includes the second slot and the second arm includes the second pin.

11. The vehicle air handling system according to claim 1, wherein
the first and second control links are longitudinally spaced from each other along a first shaft, and the first and second duct doors are mounted longitudinally between the first and second control links.

12. The vehicle air handling system according to claim 1, wherein
the first actuator is operatively coupled to one of the first and second control links to rotate the first and second control links.

13. The vehicle air handling system according to claim 1, wherein
the first panel duct door is positionable in at least a first closed position, a first fully open position and a first partially open position in response to rotation of the first control link, and
the second panel duct door is positionable in at least a second closed position, a second fully open position and a second partially open position in response to rotation of the second control link.

14. The vehicle air handling system according to claim 13, wherein
the plurality of settings include
at least two settings in which different airflow volumes are passed by the first and second panel duct doors, and
at least two settings in which same airflow volumes are passed by the first and second panel duct doors.

15. The vehicle air handling system according to claim 14, wherein
the plurality of settings include
four settings in which different airflow volumes are passed by the first and second panel duct doors, and
three settings in which same airflow volumes are passed by the first and second panel duct doors.

16. The vehicle air handling system according to claim 15, wherein
the plurality of settings include
a first setting in which the first and second panel duct doors are closed,
a second setting in which the first and second panel duct doors are partially open,
a third setting in which the first and second panel duct doors are fully open,
a fourth setting in which the first panel duct door is partially open and the second panel duct door is closed,
a fifth setting in which the first panel duct door is fully open and the second panel duct door is closed,
a sixth setting in which the first panel duct door is closed and the second panel duct door is partially open, and
a seventh setting in which the first panel duct door is closed and the second panel duct door is fully open.

17. The vehicle air handling system according to claim 1, wherein
the air duct housing includes an HVAC case with a first panel duct opening leading to the first panel duct and a second panel duct opening leading to the second panel duct, and
the first panel duct door seals against the first panel duct opening or against walls of the first panel duct, the second panel duct door seals against the second panel duct opening or against walls of the second panel duct.

* * * * *